(No Model.)

3 Sheets—Sheet 1.

C. H. WILSON.
DISTRIBUTING BOX FOR CABLE SYSTEMS.

No. 469,765.

Patented Mar. 1, 1892.

Witnesses.
Charles G. Hawley.
George R. Parker.

Inventor.
Charles H. Wilson.
By George A. Barton
Attorney.

(No Model.) 3 Sheets—Sheet 2.
C. H. WILSON.
DISTRIBUTING BOX FOR CABLE SYSTEMS.
No. 469,765. Patented Mar. 1, 1892.
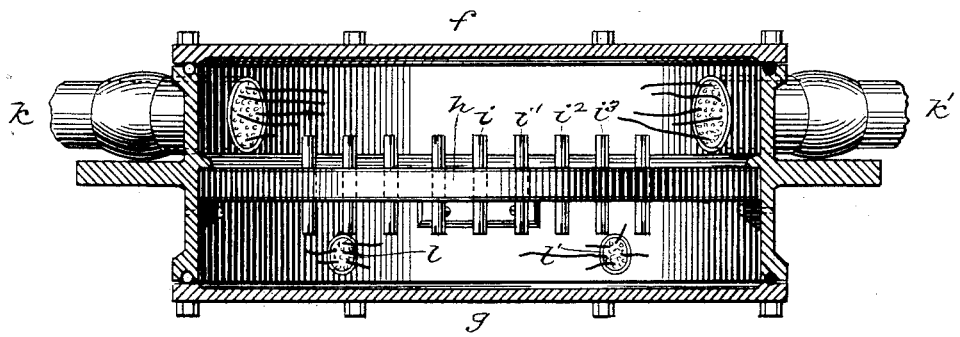
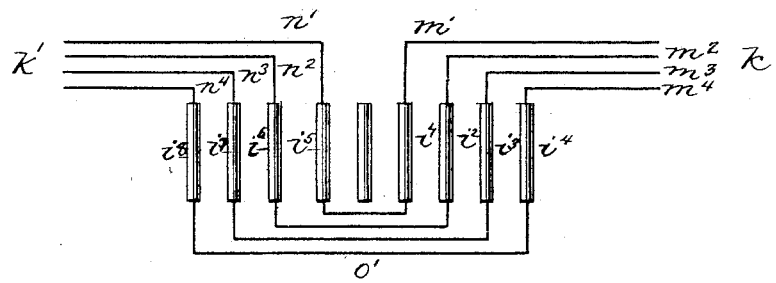
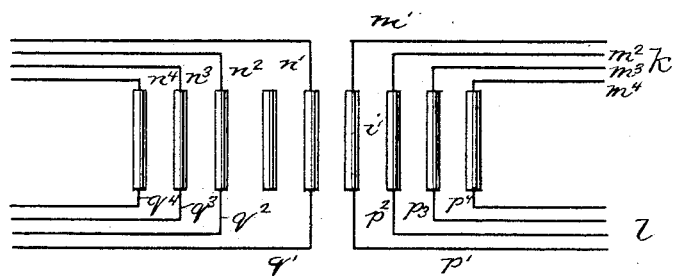
Witnesses.
Charles G. Hawley.
George R. Parker.
Inventor.
Charles H. Wilson
By George P. Barton
Attorney.

(No Model.) 3 Sheets—Sheet 3.
C. H. WILSON.
DISTRIBUTING BOX FOR CABLE SYSTEMS.

No. 469,765. Patented Mar. 1, 1892.

Witnesses.
Charles G. Hawley.
George R. Parker.

Inventor.
Charles H. Wilson
By George A. Barton
Attorney.

UNITED STATES PATENT OFFICE.

CHARLES H. WILSON, OF CHICAGO, ILLINOIS, ASSIGNOR TO THE AMERICAN BELL TELEPHONE COMPANY, OF BOSTON, MASSACHUSETTS.

DISTRIBUTING-BOX FOR CABLE SYSTEMS.

SPECIFICATION forming part of Letters Patent No. 469,765, dated March 1, 1892.

Application filed September 19, 1889. Serial No. 324,453. (No model.)

*To all whom it may concern:*

Be it known that I, CHARLES H. WILSON, a citizen of the United States, residing at Chicago, in the county of Cook and State of Illinois, have invented a certain new and useful Improvement in Distributing-Boxes and Vaults for Underground Electric Cable Systems, (Case 7,) of which the following is a full, clear, concise, and exact description, reference being had to the accompanying drawings, forming a part of this specification.

My invention relates to distributing the wires of underground electric cables at the vaults; and it consists, briefly stated, in the construction of a distribution-box and the vault or man-hole for containing the same so arranged that the wires of cables coming in from one duct may be connected with the wires of the cable or cables of any other duct or ducts of the same vault, as may be found necessary or convenient. The man-hole or vault I preferably construct so as to be in horizontal cross-section in the form of a cross, the ducts being connected with niches thus formed either opposite one another or at right angles to one another. The distribution box or boxes may be placed in one or the other of the niches, thus affording room for the workmen who enter the chamber through the opening in the top.

My invention is illustrated in the accompanying drawings, in which—

Figure 1:
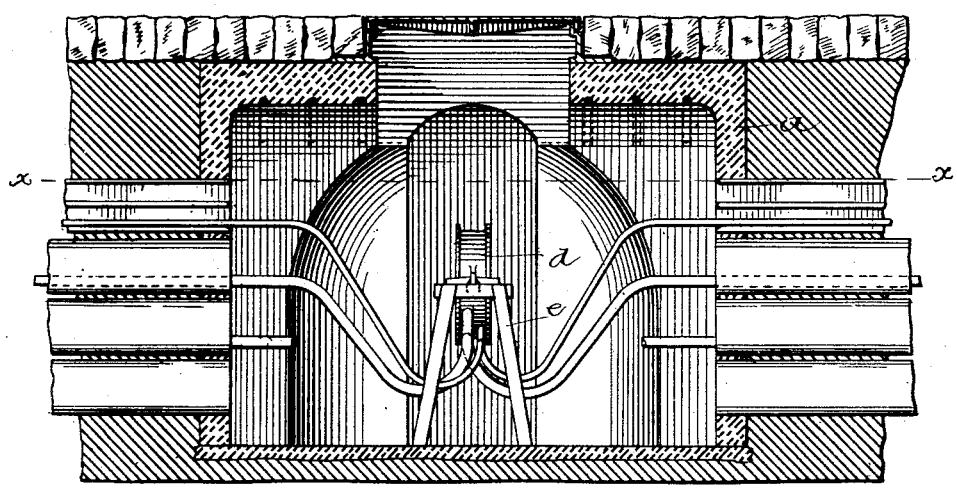
Figure 2:
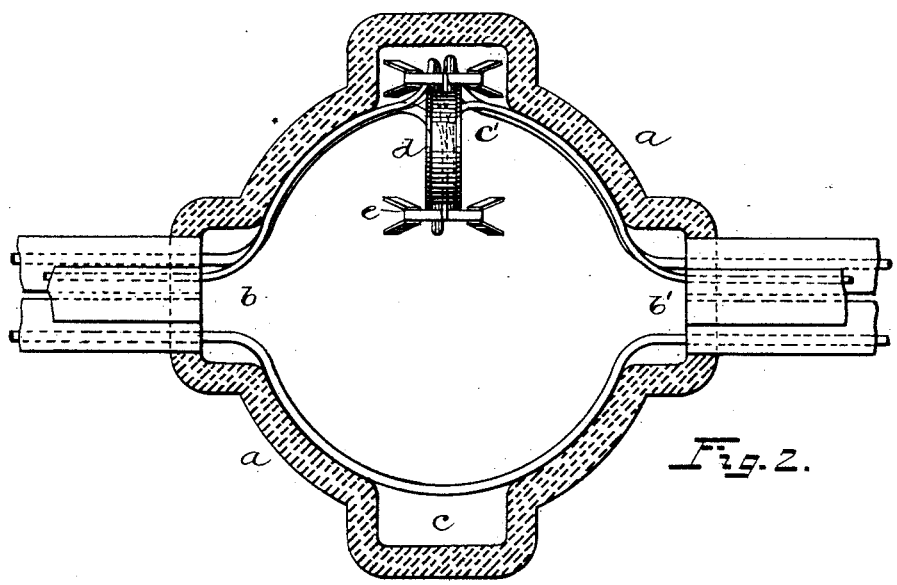
Figure 6:
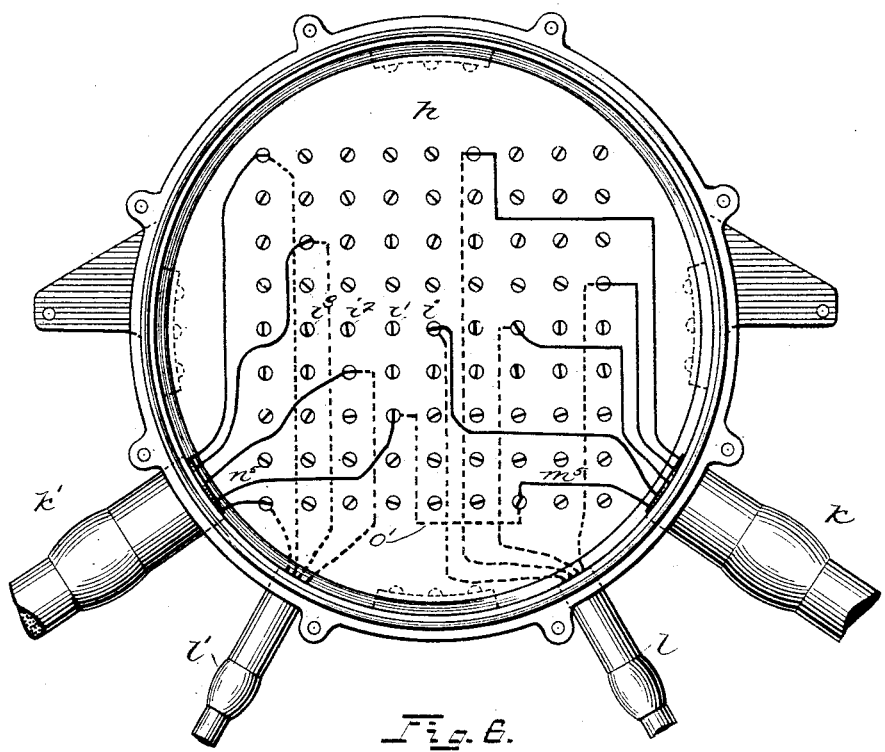

Figure 1 is a vertical longitudinal central section showing a vault containing a distribution-box embodying my invention. Fig. 2 is a plan view of the same upon section-line $xx$ of Fig. 1. Fig. 3 is a detailed sectional view of the distribution-box. Figs. 4 and 5 are diagrams showing different ways of distributing the wires. Fig. 6 is a view showing the manner of distributing the wires, somewhat in detail.

Like parts are indicated by similar letters of reference throughout the different figures.

Referring now to Figs. 1 and 2, it will be seen that the walls $a$ of the chamber are in horizontal section of the form shown, being provided with opposite niches $b\ b'\ c\ c'$. The cables are placed in the conduits opening into niches $b\ b'$. The distributing-box $d$ is placed upon a frame or horse $e$, as shown, in the niche $c'$ between the niches $b$ and $b'$. Generally one distributing-box at each vault will be sufficient.

The construction of the distributing-box will be readily understood by reference to Figs. 3 and 6.

The casing is preferably of iron, the sides thereof $f$ and $g$ being screwed to the cylinder, the joints between the sides and the cylinder being made tight by rubber gaskets or other suitable packing. In the center of this box, as shown, is supported a disk or piece $h$ of insulating material containing pins $i'\ i^2\ i^3$, &c., each of these pins $i$ projecting on opposite sides of the disk and being insulated from all the other pins and being provided with means for connecting wires with the different ends thereof. Thus I preferably provide a slot, as shown, and place the end of a wire in this slot. The wire is soldered therein, so as to form a perfect electrical connection. The box may be made of such size as to contain four hundred of these insulated connecting-pins $i$, these being sufficient for distributing the wires of two hundred circuits; but it may be of any size to suit the requirements in each case where used.

As shown more clearly in Fig. 3, it will be seen that either side of this box may be removed, so as to afford access to different ends of the pins. We will suppose the cable $k$ and the cable $k'$ connected with the box above the disk and the cables $l\ l'$ connected therewith below the same. There should be enough pins to make a separate connection with each of the wires of each of these cables above. These connections, being made, may remain permanent—that is to say, suppose the cable $k$ contains two hundred conductors $m$. Each of these conductors, as $m'\ m^2\ m^3$, &c., would be connected with the upper end of a different pin $i$ and the wires $n$ of the other cable $k'$ would be in like manner connected each with its own appropriate insulated pin $i$, as shown more clearly in Fig. 6. Now the distribution of these wires—that is to say, the formation of the circuits—will be determined by the cross connections $o'$ between the lower ends of the pins $i$. Thus, as indicated in Fig. 4, the conductors $m'\ m^2\ m^3\ m^4$ are connected with the upper ends of pins $i'\ i^2\ i^3\ i^4$, and the conductors $n'$ $n^2$ $n^3$ $n^4$ of cable $k'$ are connected with the upper ends of pins $i^5$ $i^6$ $i^7$ $i^8$. These pins being connected in pairs below, the circuits are completed, as $m'$ $n'$ $m^2$ $n^2$, &c. As shown, however, in Fig. 5, the circuit $m'$ is connected through pin $i'$ and thence with conductor $p'$ of cable $l$, $m^2$ being connected with conductor $p^2$ of cable $l$, $m^3$ with conductor $p^3$, and $m^4$ with conductor $p^4$. In like manner the wires $n'$ $n^2$ $n^3$ $n^4$ in Fig. 5 are shown connected with the conductors $q'$ $q^2$ $q^3$ $q^4$, respectively, of cable $l'$. In Fig. 6 these same connections shown in Fig. 5 are indicated, the connections below being in dotted lines. An additional connection is shown in Fig. 6, the wire $m^5$ of cable $k$ being connected with the wire $n^5$ of cable $k'$ by the cross connecting-wire $o'$. These cross connecting-wires are interlaced between the pins, as shown, so as to leave the soldered connections exposed. It will be understood that the cross connecting-wires, except at the soldered joints, are insulated. I have referred to the portions $k$ $k'$ of the cable as separate cables. It is evident, however, that when their wires are connected together to form continuous circuits, for example, as shown in Fig. 4, the two parts $k$ $k'$ might be considered as a single cable. The insulation of the cross-connection wires is preferably composed of a non-inflammable insulating substance—such as asbestos or its equivalent—in order that the distributing-box may be thoroughly dried by means of a flame from a blow-lamp before the covers are placed in position and sealed.

It will thus be seen that the wires of the different cables may be connected with one another or distributed to form such circuits as may be required. The distributing-box being placed in one niche or angle of the chamber and the ducts containing the cables being connected with their niches, ample room is afforded for the workmen within the manhole or vault.

Having thus described my invention, I claim as new and desire to secure by Letters Patent—

1. The street-vault provided with the niches $b$ $b'$ $c$ $c'$, a distribution-box supported in said vault in a niche intermediate of the niches containing the ends of the ducts for the cables, and the cables leading to said distribution-box, the wires thereof being connected therein, substantially as and for the purpose specified.

2. A distribution-box provided with a partition to separate the box into two compartments, said partition being provided with metal pins insulated from each other for affording electrical connections through said partition, the box being provided with removable covers on opposite sides, so that access may be had to either chamber without opening the other.

In witness whereof I hereunto subscribe my name this 16th day of September, A. D. 1889.

CHARLES H. WILSON.

Witnesses:
GEORGE P. BARTON,
ELLA EDLER.